United States Patent [19]
Sassone

[11] Patent Number: 5,680,726
[45] Date of Patent: Oct. 28, 1997

[54] FISH-HOOK

[75] Inventor: Ernesto Sassone, Casale Monferrato, Italy

[73] Assignee: Netts S.r.l., Alessandria, Italy

[21] Appl. No.: 420,473

[22] Filed: Apr. 12, 1995

[30] Foreign Application Priority Data

Apr. 14, 1994 [IT] Italy .................................. AL940001 U

[51] Int. Cl.⁶ .................................................. A01K 83/00
[52] U.S. Cl. ...................... 43/43.16; 43/44.83; 43/42.39
[58] Field of Search .............................. 43/43.16, 44.83, 43/42.52, 42.39, 44.81, 44.85, 44.86; 24/908

[56] References Cited

U.S. PATENT DOCUMENTS

| | | | |
|---|---|---|---|
| 372,686 | 11/1887 | Lester | 43/44.83 |
| 745,066 | 11/1903 | Koch | 43/44.81 |
| 745,131 | 11/1903 | Abbath | 43/44.83 |
| 2,674,823 | 4/1954 | Gellings | 43/42.39 |
| 2,871,540 | 2/1959 | Smith | 43/44.83 |
| 2,989,817 | 6/1961 | Kepler | 43/44.83 |
| 4,667,435 | 5/1987 | Fujimoto | 43/43.16 |
| 5,113,616 | 5/1992 | McManus | 43/43.16 |
| 5,138,790 | 8/1992 | McManus | 43/43.16 |

Primary Examiner—Kurt Rowan
Attorney, Agent, or Firm—Sughrue, Mion, Zinn, Macpeak & Seas, PLLC

[57] ABSTRACT

A fish-hook comprises a shank with a hook portion at one end and an eyelet at the other end, and a safety-pin member fixedly secured to the shank through the eyelet and releasably carrying one or more interchangeable ballast or plummet elements. The or each plummet element comprises a pierced and preferably spheric body.

8 Claims, 2 Drawing Sheets

FISH-HOOK

BACKGROUND OF THE INVENTION

The present invention is related to a fish-hook particularly intended for sports fishing with streamer baits, namely for spinning or the like, such as trolling or hauling fishing.

In these kinds of fishing practice fish-hook assemblies are usually employed, generally designated as "jig", which are provided with a sinker ballast or plummet formed as a unitary body with the fish-hook shank. Usually, the plummet is constituted by a mass of lead directly casted onto the fish-hook shank near to an eyelet, provided at the end thereof opposite to the hook portion of the fish-hook, for the connection to a fishing line.

When either the fish-hook or the plummet of the jig has to be replaced, for instance owing to changed fishing needs, the entire jig assembly has to be substituted. Moreover, according to the above known construction, fish-hooks of a larger size are as a rule equipped with larger and heavier plummets, while fish-hooks of a smaller size are provided with smaller and lighter plummets. The drawback thus results that the fisherman is not allowed to satisfactorily meet particular requirements, such as availability in certain conditions of large size fish-hooks with light plummets, or of reduced size fish-hooks with heavier plummets. On the other hand, plummets made of lead are nowadays undesirable owing to environmental problems.

SUMMARY OF THE INVENTION

The object of the present invention is to overcome the above inconveniences and to provide a fish-hook of the above-mentioned "jig" type having a releasable and readily replaceable plummet, so that the same fish-hook can be selectively equipped with the most proper plummet, selected in accordance with the contingent need, among a variety of plummets of different weights.

Another object of the invention is to provide a fish-hook of the above-referenced type enabling quick and convenient replacement of the plummet thereof by virtue of a unique construction which is simple and convenient from the point of view both of manufacture and of use.

Still another object of the invention is to avoid the use of ballasts or plummets made of contaminating materials such as lead.

According to the invention, the above objects are achieved by a fish-hook of the "jig" type comprising a shank formed at one end thereof with a hook portion and at the other end thereof with an eyelet, and a plummet releasably carried by said shank, wherein said shank is provided with a safety-pin member including a first arm having an inner end fixedly secured to said other end of the shank via said eyelet and an outer end, a second arm extending substantially transversely of said first arm and forming a retaining element, and a third arm resiliently pivoted at said outer end of said first arm between an open condition and a closed condition relative to said retaining element, and wherein said plummet comprises a pierced body slidably engaging said third arm between said outer end of said first arm and said retaining element.

According to a preferred embodiment of the invention, said first, second and third arms of the safety pin are integrally formed by a length of metal wire. The length of wire is formed, at the inner end of said first arm, with a bent section fitted through said eyelet and with a terminal looped section helically wound around said shank in proximity to said eyelet and from which said second arm is departing. Said wire is forming, at said outer end of said first arm, a coil spring from which said third arm is departing.

Conveniently, said shank and hook portion and said safety-pin are substantially coplanar, and said hook portion and said safety-pin are arranged at opposite sides of said shank.

BRIEF DESCRIPTION OF THE DRAWINGS

The invention will now be disclosed in detail with reference to the accompanying drawings, purely provided by way of non limiting example, in which.

DETAILED DESCRIPTION OF PREFERRED EMBODIMENTS

Figure 1:
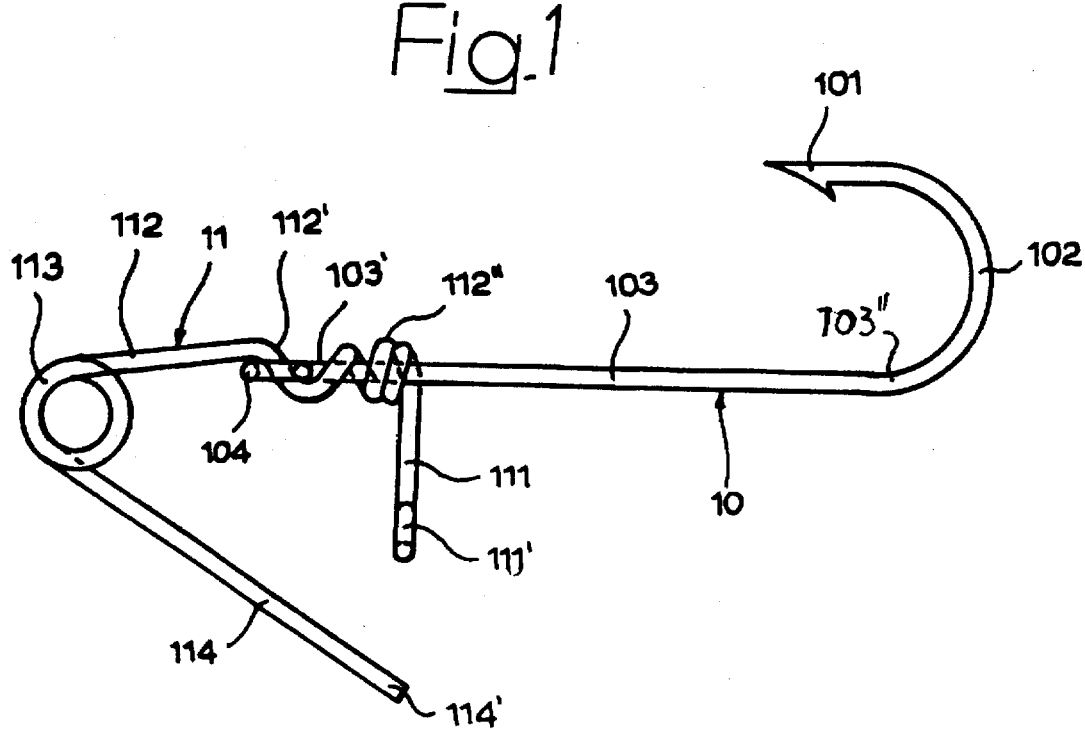
FIG. 1 is a diagrammatic side elevational view of a fish-hook according to the invention, shown in an open condition of a safety-pin thereof.

Referring to the drawings, a fish-hook 10 is comprised, in a generally known way, of a metal wire defining a longitudinal straight shank 103 formed at a first end 103 with a C-shaped hook portion 102 having a harpoon tip 101.

A second end 103' of the shank 103 is circularly bent so as to define an eyelet 104 which would normally be used for fastening a fishing line.

According to the invention, the fish-hook 10 is provided with a safety-pin member 11 which is fixedly secured to the shank 103, at the end thereof opposite to the hook portion 102, via the eyelet 104.

The safety-pin 11 is constituted by a length of metal wire, for instance the same wire employed for the manufacture of the fish-hook 10, which is bent according to a generally triangular configuration. In more detail, the safety-pin member 11 is comprised of a first arm 112 which is generally aligned with the shank 103 and is formed at one end with a substantially S-shaped bent portion 112' fitted through the eyelet 104. Namely, the bent portion 112' is entering into the eyelet 104 from the side of the shank 103 facing the tip 101 of the fish-hook 10, and is exiting from the eyelet 104 on the opposite side thereof.

Beyond the bent portion 112', the same end of the first arm 112 forms a looped section 112" which is helically wound around a corresponding portion of the shank 103 immediately adjacent to the eyelet 104.

A second arm 112 is departing from the looped section 112' and projects substantially at right angle from the shank 103, towards the side thereof opposite to the tip 101 of the hook portion 102. The second arm 111 is formed with a hooked free end 111' defining a retaining element.

The distal or outer end of the first arm 112 is circularly bent so as to form a coil spring 113 from which a third arm 114 is departing.

Figure 2:
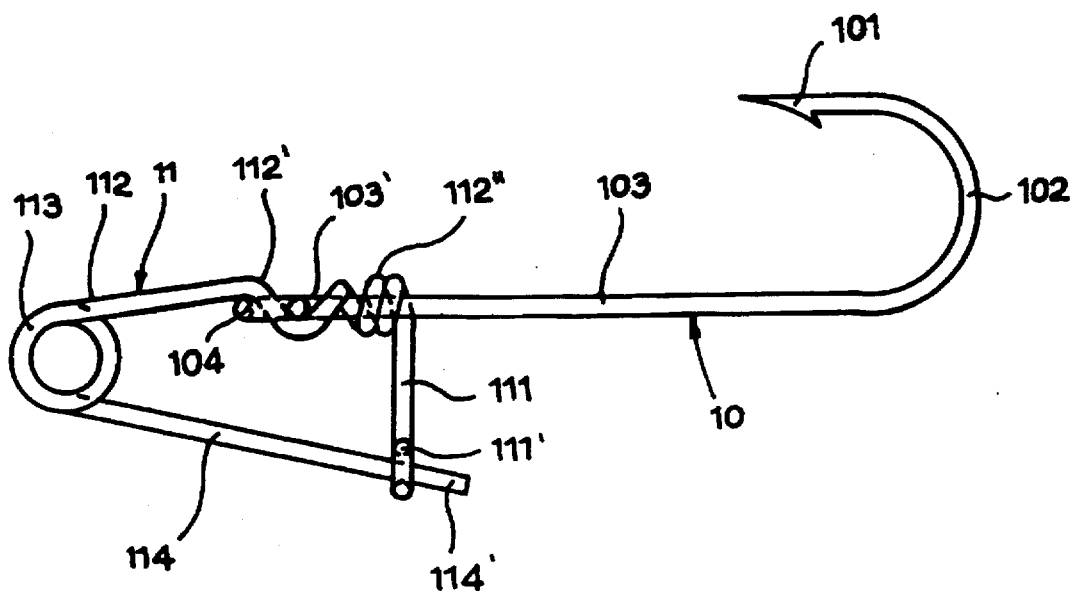
FIG. 2 is a view same as FIG. 1 showing a closed condition of the fish-hook safety-pin.
Figure 3:
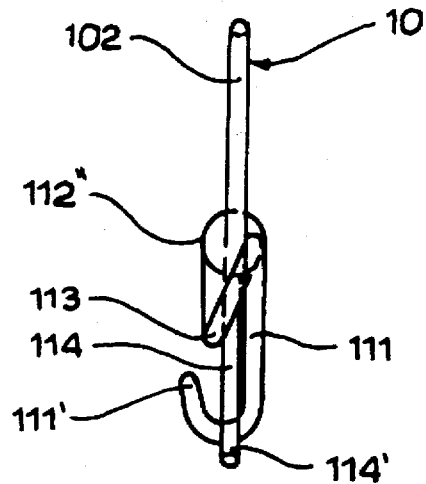
FIG. 3 is a front elevational view of FIG. 2.
Figure 4:
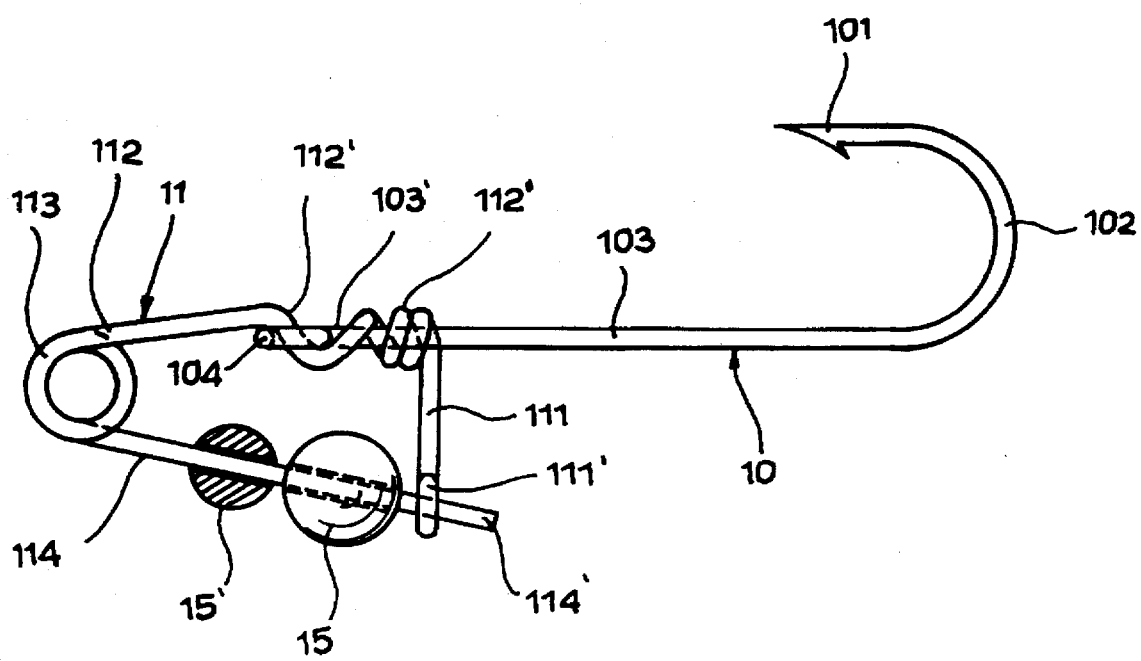
FIG. 4 is a view same as FIG. 2 with exemplary ballast or plummet elements carried by the fish-hook safety-pin.

This third arm 114 is thus resiliently pivoted relative to the outer end of the first arm 112, and is manually displaceable from the undeformed open position of the safety-pin member 11 shown in FIG. 1, in which the third arm 114 is spaced apart from the hooked end 111' of the second arm 111, and the closed position depicted in FIGS. 2 through 4, and vice versa. In the closed position, the third arm 114 is urged by the coil spring 113 into engagement within the hooked end 111' of the third arm 111, with its free end 114' projecting outwardly of the hooked end 111' so as to define a manoeuvring tip.

The whole safety-pin 11, i.e. the first, second and third arms 112, 111 and 114 thereof, are substantially coplanar with the shank 103 and hook portion 102 thereof. According to the above disclosure, the second and third arms 111, 114 are arranged on the side of the shank 103 opposite to the hook portion 102 of the fish-hook 10.

The safety-pin 11 is designed to releasably retain one or more interchangeable ballast or plummet elements 15, 15' of different weights. As it is shown in FIG. 4, the or each ballast element 15, 15' is preferably and conveniently formed by a diametrically pierced spheric metal body slidably engaging the third arm 114 between the coil spring 113 and the retaining end 111' of the second arm 111.

In use, when the safety-pin 11 is in the open condition shown in FIG. 1, a selected plummet element or elements 15, 15' can be slipped over the third arm 114, from the free end 114' thereof, in accordance with the weight needed in accordance to the fisherman's demand. The safety-pin 11 is then brought to its closed position of FIGS. 2–4, simply pushing the end 114' of the third arm 114 towards the shank 103 until snap engagement thereof into the hooked end 111' of the second arm 111, against the action of the coil spring 113. Maintainance of the closed condition is ensured by the bias of the coil spring 113, thus preventing any risks of accidental disengageament of the ballast element or elements 15, 15' therefrom.

The coil spring 113 is in turn defining a supplementary eyelet for a convenient fastened connection of the fish-hook 10 to a fishing line.

It is to be pointed out that the length of the second arm 111, and thus the distance between the third arm 14 and the first arm 112 in the closed condition of the safety-pin 11, is such as to accomodate ballast elements even of a larger size, and thus weight, than those shown in FIG. 4.

A main advantage of the invention over the prior art resides in that the weight of the fish-hook ballast or plummet can be finely and even micrometrically adjusted, according to the different fishing demands, through a proper selection of the number, weight, size, shape and material of the plummet bodies 15, 15'. In this connection, a set of different interchangeable plummet elements can be conveniently provided as an outfit of the fish-hook 10 of the invention.

A further advantage of the disclosed arrangement consists of that, in use, the selected plummet 15, 15' fitted within the safety-pin 11 is offset or misaligned with respect to the longitudinal shank 103, whereby the fish-hook 10 in use is constantly maintained with its hook portion 102 and tip 101 facing upwardly, thus preventing any risks of getting stuck to the water bottom.

Finally, the releasable and interchangeable plummets 15, 15' can be conveniently made of any suitable material, for instance brass, thus not necessarily of lead.

Naturally the details of construction may be widely varied with respect to the disclosed embodiment, without thereby departing from the scope and spirit of the present invention, such as defined in the appended claims.

What is claimed is:

1. A fish-hook comprising a shank having first and second ends, a hook portion formed at said first end of said shank and an eyelet formed at said second end of said shank, and plummet means, wherein said shank is provided with a safety-pin member including a first arm having an inner end fixedly secured to said second end of said shank and an outer end, a second arm extending substantially transversely of said first arm and forming a retaining element, and a third arm resiliently pivoted at said outer end of said first arm between an open position disengaged from said retaining element and a closed position engaged with said retaining element whereby said safety-pin member may be opened and closed, and wherein said plummet means comprise a pierced body slidably and releasably engaging said third arm between said outer end of said first arm and said retaining element.

2. Fish-hook according to claim 1, comprising a length of wire integrally forming said first, second and third arms of said safety-pin.

3. Fish-hook according to claim 2, wherein said length of wire is formed, at said inner end of said first arm, with a bent section fitted through said eyelet and with a terminal looped section helically wound around said shank in proximity to said eyelet and from which said second arm is departing.

4. Fish-hook according to claim 3, wherein said wire length is forming, at said outer end of said first arm, a coil spring from which said third arm is departing.

5. Fish-hook according to claim 4, wherein said coil spring is defining a supplementary eyelet.

6. Fish-hook according to claim 1, wherein said shank and hook portion and said safety-pin are generally coplanar.

7. Fish-hook according to claim 6, wherein said hook portion and said safety-pin are arranged at opposite sides of said shank.

8. Fish-hook according to claim 1, wherein said plummet pierced body is generally spheric.

* * * * *